(12) United States Patent
Linden

(10) Patent No.: US 7,434,713 B2
(45) Date of Patent: Oct. 14, 2008

(54) LOAD CARRIER FOOT

(75) Inventor: Claes-Goran Linden, Gnosjo (SE)

(73) Assignee: Thule Sweden AB, Hillerstorp (SE)

( * ) Notice: Subject to any disclaimer, the term of this patent is extended or adjusted under 35 U.S.C. 154(b) by 25 days.

(21) Appl. No.: 10/711,769

(22) Filed: Oct. 4, 2004

(65) Prior Publication Data
US 2005/0051684 A1      Mar. 10, 2005

Related U.S. Application Data

(63) Continuation of application No. PCT/SE03/00465, filed on Mar. 20, 2003, now abandoned.

(30) Foreign Application Priority Data

Apr. 4, 2002      (SE)      ................................ 0201015

(51) Int. Cl.
*B60R 9/00*      (2006.01)
*B60R 7/00*      (2006.01)
(52) U.S. Cl. ........................ 224/326; 224/324; 224/323; 224/329; 224/42.38
(58) Field of Classification Search ................ 224/326, 224/324, 309, 317, 321, 323, 329, 330, 42.38, 224/558, 570, 571, 405, 42.28, 559, 331
See application file for complete search history.

(56) References Cited

U.S. PATENT DOCUMENTS

| | | | | |
|---|---|---|---|---|
| 3,638,844 A | * | 2/1972 | Bronson | ...................... 224/319 |
| 4,728,019 A | * | 3/1988 | Olliges | ........................ 224/329 |
| 4,877,169 A | * | 10/1989 | Grim | ........................... 224/331 |
| 5,104,020 A | * | 4/1992 | Arvidsson et al. | ............ 224/331 |
| 5,641,107 A | * | 6/1997 | Mann | ........................... 224/331 |
| 5,660,505 A | * | 8/1997 | Emory, III | ............... 405/258.1 |

FOREIGN PATENT DOCUMENTS

| | | |
|---|---|---|
| DE | 3405357 A1 | 8/1985 |
| DE | 10101084 A1 * | 7/2002 |
| EP | 1494894 B1 | 5/2007 |
| SE | 461837 B | 4/1990 |
| WO | 0015465 A1 | 3/2000 |

OTHER PUBLICATIONS

International Search Report, dated Jun. 23, 2003, from International Application No. PCT/SE03/00465.

\* cited by examiner

*Primary Examiner*—Nathan J Newhouse
*Assistant Examiner*—Lester L Vanterpool
(74) *Attorney, Agent, or Firm*—Novak Druce + Quigg, LLP

(57) ABSTRACT

A load carrier foot for mounting a load carrier bar on a vehicle roof includes a foot part having an upper end attached to the load carrier bar, and a lower end mounted on a roof edge area. The foot part is secured to the roof by a clamping plate gripping a body fold. The clamping plate has a tightening mechanism and a pivot pin in pivotable engagement with the foot part. The foot part and the clamping plate are each provided with contact faces above and below the pivot pin, which interact in a locking manner to prevent the clamping plate from turning about the pivot pin and losing a grip on the body fold when the clamping plate is tightened against the foot part.

13 Claims, 6 Drawing Sheets

US 7,434,713 B2

LOAD CARRIER FOOT

CROSS-REFERENCE TO RELATED APPLICATIONS

The present application is a continuation patent application of International Application No. PCT/SE03/00465 filed 20 Mar. 2003 and published on 16 Oct. 2003 as WO 03/084782 A1 and which was published in English pursuant to Article 21(2) of the Patent Cooperation Treaty. Said application claims priority to Swedish Application No. 0201015-5 filed 4 Apr. 2002. Said applications are expressly incorporated herein by reference in their entireties.

FIELD OF INVENTION

The present invention relates to a load carrier foot for attaching a load carrier bar to a vehicle roof. The load carrier foot comprises (includes, but is not necessarily limited to) a foot part which is attached at the upper end to the load carrier bar and which, at its lower end, is mounted on a roof edge area of the vehicle. The foot part is attached to the roof by means of a clamping plate which, by means of a gripping means, grips a body fold (protrusion) located under the roof edge area. The clamping plate is in pivot able engagement with the foot part by means of a pivot pin and in tightenable engagement with the foot part by means of a tightening arrangement. The foot part and clamping plate are each provided with contact faces located under the pivot pin when the load carrier foot is mounted on the vehicle roof. The contact faces interact to prevent the clamping plate from turning about the pivot pin and causing the gripping means to lose its grip with the body fold when the clamping plate is tightened by the tightening arrangement against the foot part.

BACKGROUND OF INVENTION

A load carrier foot of the type described above is shown in German patent DE 3405357. However, a disadvantage of this earlier type of foot is that the contact faces incorporated in the design do not always ensure that the gripping means maintains its grip when the clamping plate is tightened against the load carrier foot. As a result, the user may, on observing this situation, attempt to further tighten the clamping plate. This carries with it the possibly of causing the foot to damage the vehicle roof or, if the situation is not observed (appreciated), causing the load carrier foot to lose its grip completely, a possibility of which can have catastrophic consequences since the load carrier may then be thrown from the vehicle roof.

SUMMARY OF THE INVENTION

The present invention overcomes the aforementioned disadvantages by means of a load carrier foot of the type described in the introduction above, and which is characterized by a pivot pin that is pivotally connected to the foot part. A clamping plate and the load carrier foot are each provided with contact faces, located above the pivot pin, which interact in a locking manner, and that further prevent the clamping plate gripping means from being twisted out of engagement when the clamping plate is tightened.

BRIEF DESCRIPTION OF DRAWINGS

A preferred embodiment of a load carrier foot in accordance with the present invention will hereinafter be described with reference to the appended figures, of which.

DETAILED DESCRIPTION

Figure 1:
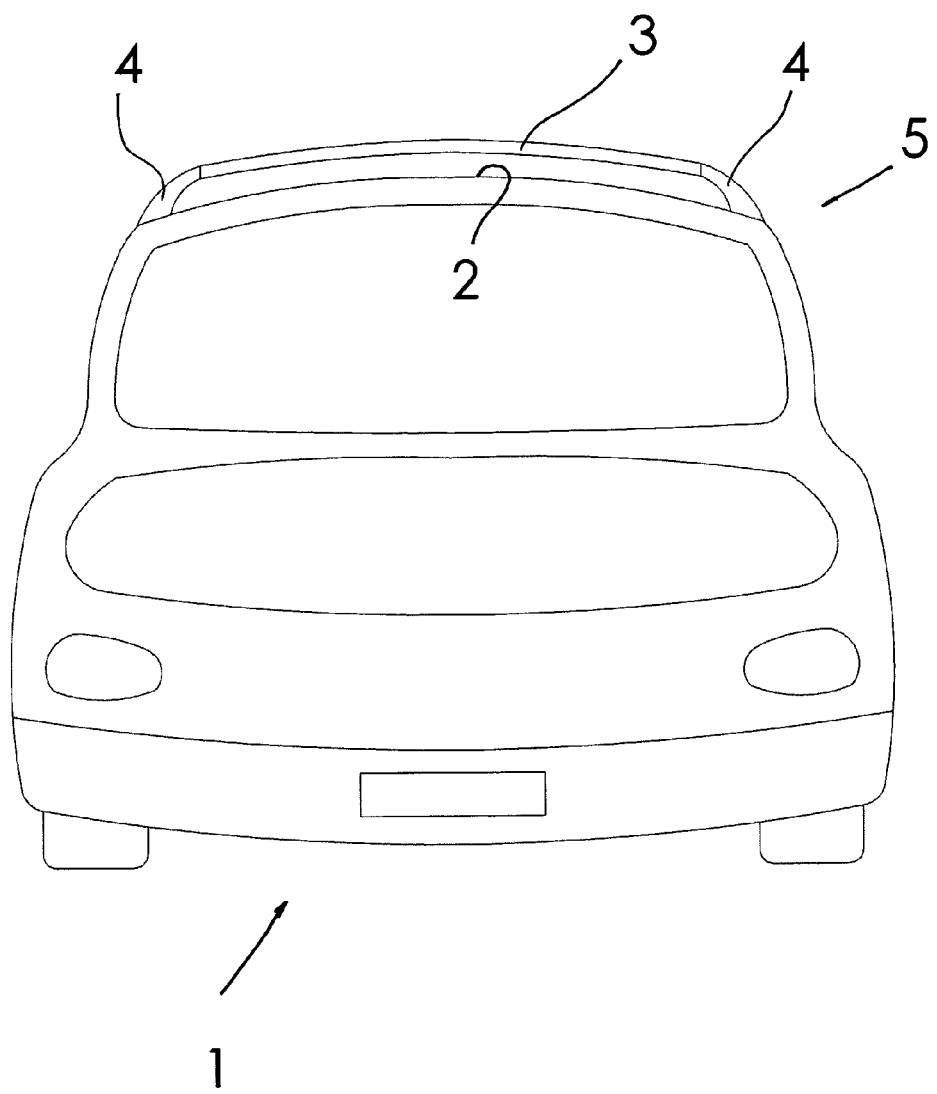
FIG. 1 is a schematic view of a vehicle with a roof-mounted load carrier.

FIG. 1 shows a vehicle 1 with a load carrier bar 3 mounted on the roof 2 by means of load carrier feet 4 to the roof edge areas 5. Regarding the invention(s) described herein, it should be appreciated that the same are susceptible to various modifications and alternative forms, with specific embodiments thereof being shown in the drawings, and will be described in greater detail herein below. It should be understood, however, that it is not intended to limit the invention to the particular form shown, but on the contrary, the intention is to cover all modifications, equivalents, and alternatives falling within the scope of the invention as defined by the claims.

Figure 2:
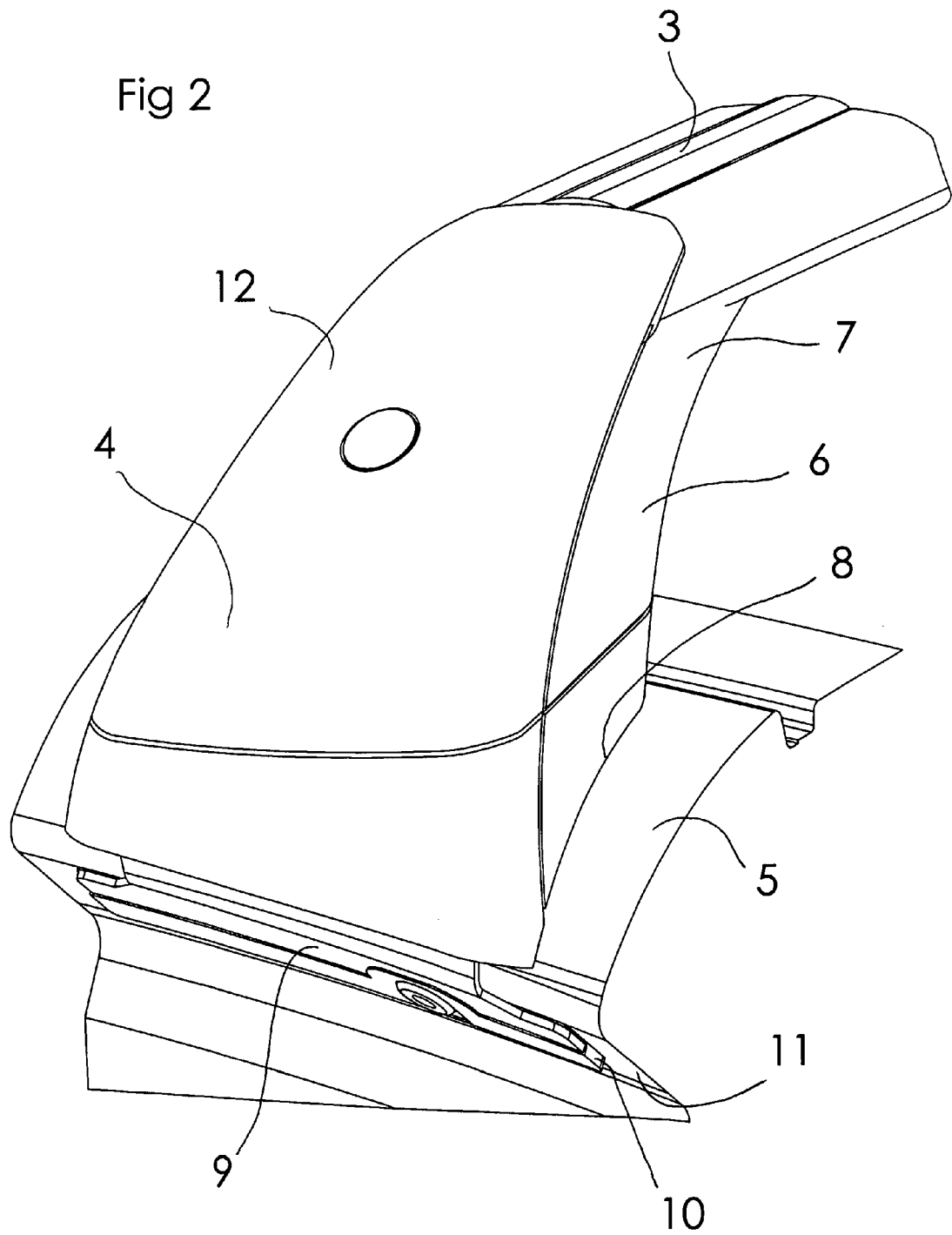
FIG. 2 is a perspective view showing a roof edge area with a load carrier foot configured in accordance with the present invention mounted thereupon.

FIG. 2 shows a roof edge area (region) 5 with a load carrier foot 4 provided with a foot part (carrier foot) 6. The upper end 7 of the foot part 6 is connected to a load carrier bar 3. The lower end 8 of the foot part 6 rests against a roof edge area 5, and a clamping plate 9 attached to the foot part has an integral gripping portion 10 that grips a body fold 11 located under the roof edge area 5. Exemplarily, the body fold 11 may be a door or window opening. The figure furthermore shows a cover 12, the function of which is to cover the mechanism that is housed in the foot part, and which will be described in further detail below, and the cover also provides the load carrier foot with an attractive appearance.

Figure 3:
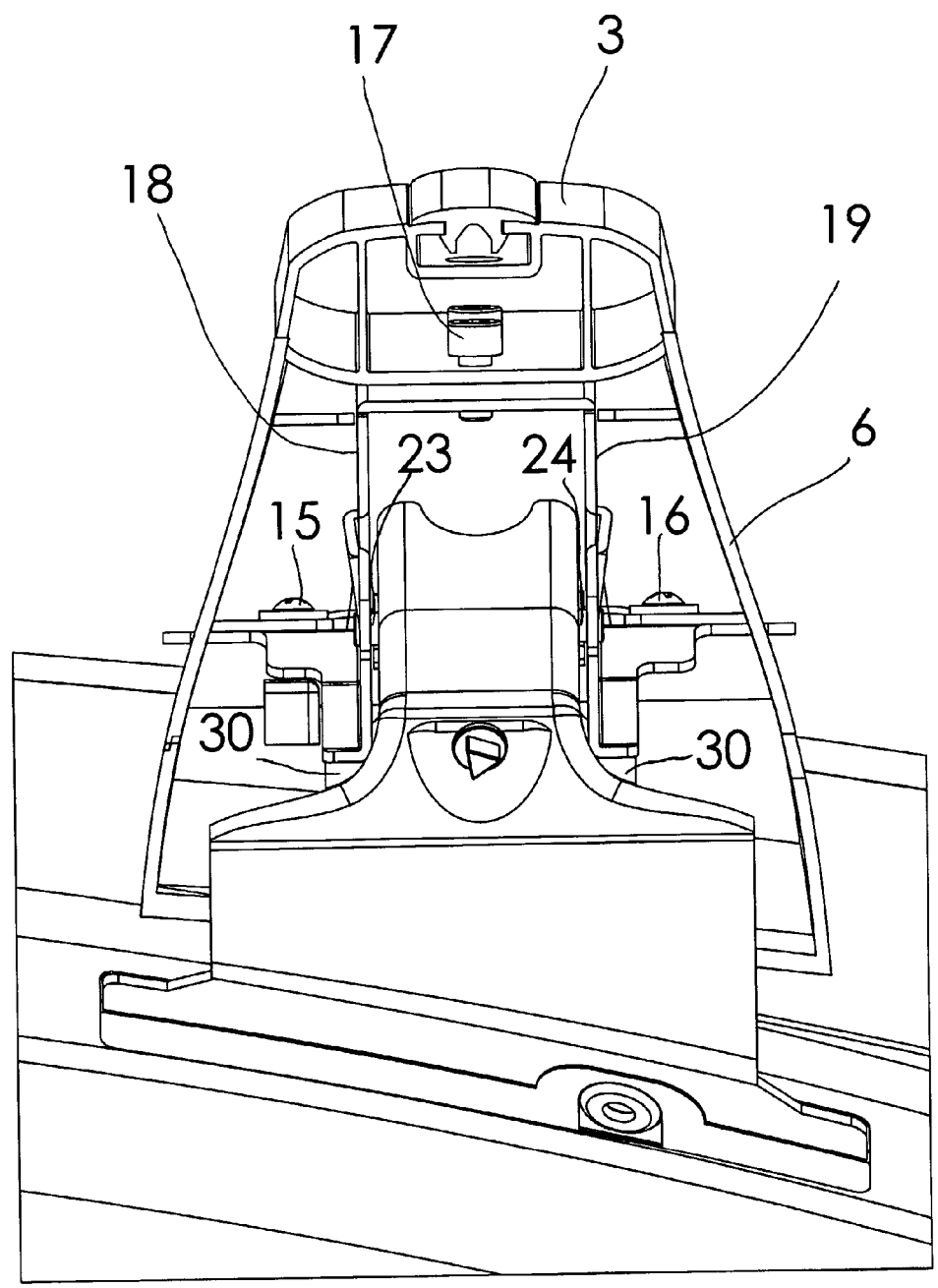
FIG. 3 is an lavational, partial cutaway view corresponding to FIG. 2, but seen from the side, with the interior of the foot exposed.
Figure 4:
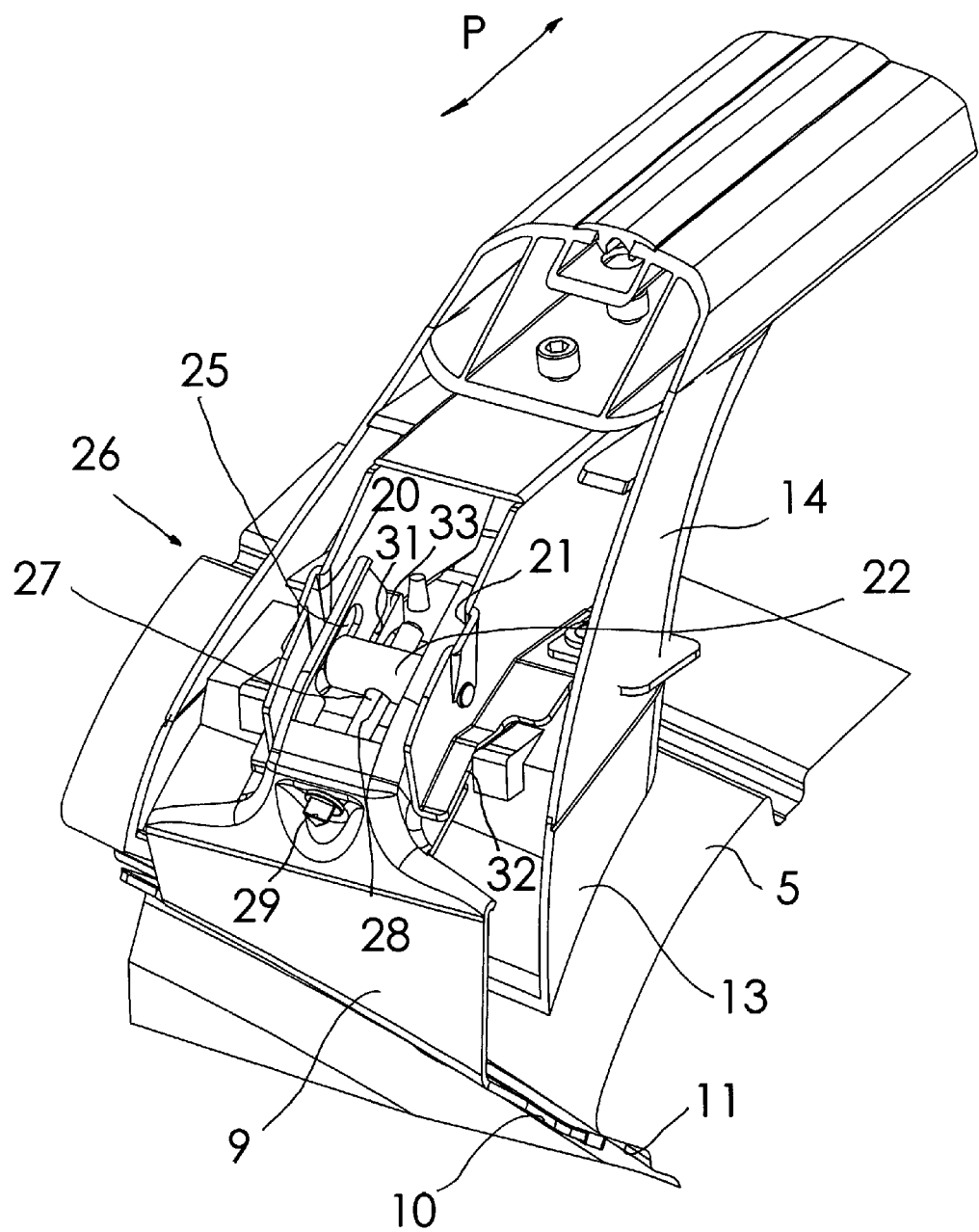
FIG. 4 is a perspective, partial cutaway view in which the inside of the load carrier foot is visible, and in which part of the clamping plate has been omitted to show the invention more clearly.

FIGS. 3 and 4 are detail views of the load carrier foot with the cover 12 omitted. These figures show that the foot part 6 comprises a base part 13, which rests on the roof edge area 5. The base part may preferably be made of a plastic material to prevent it from damaging the vehicle's paintwork. A housing part 14 is permanently attached to the base part 13 with fastening devices 15 and 16, respectively. The housing part supports a load carrier bar 3 which is permanently attached to the housing part by means of screws 17. The housing part 6 incorporates walls 18 and 19, in which channels 20 and 21, respectively, are provided. A pivot pin 22 is seated in the channels 20 and 21 by means of journals 23 and 24 which extend into the respective channels and are free to turn.

The clamping plate 9 is attached to the pivot pin 22 by means of open slots 25 in the clamping plate (only one of which is visible in Fig. 4), enclosing the pivot pin journals 23 and 24, respectively. This arrangement permits the clamping plate to be moved upward and downward in the direction indicated by the double arrow P shown in Fig. 4. A tightening arrangement 26, comprising a screw 27 threaded into a tapped hole 28 in the pivot pin 22, and with a head bearing on the clamping plate 9, enables the clamping plate and gripping means to be moved, in a manner familiar to one skilled in the art, upward towards the foot part 6. in this way the gripping means grips the body fold 11 and tightens the load carrier foot 3 against the roof edge area 5.

The clamping plate is provided with first lower contact faces 30 located under the pivot pin 22 and second upper contact faces 31 located above the pivot pin 22. Although only one of these is visible in FIG. 4, it will easily understood that the clamping plate is provided with a corresponding face in the area hidden by the wall 19. The walls 18 and 19 are provided respectively with second lower contact faces 32(only one of which is visible in the figure), which interact with the first lower contact faces 30 and first upper contact faces 33, which faces, in turn, interact with the second upper contact faces 31.

Figure 5:
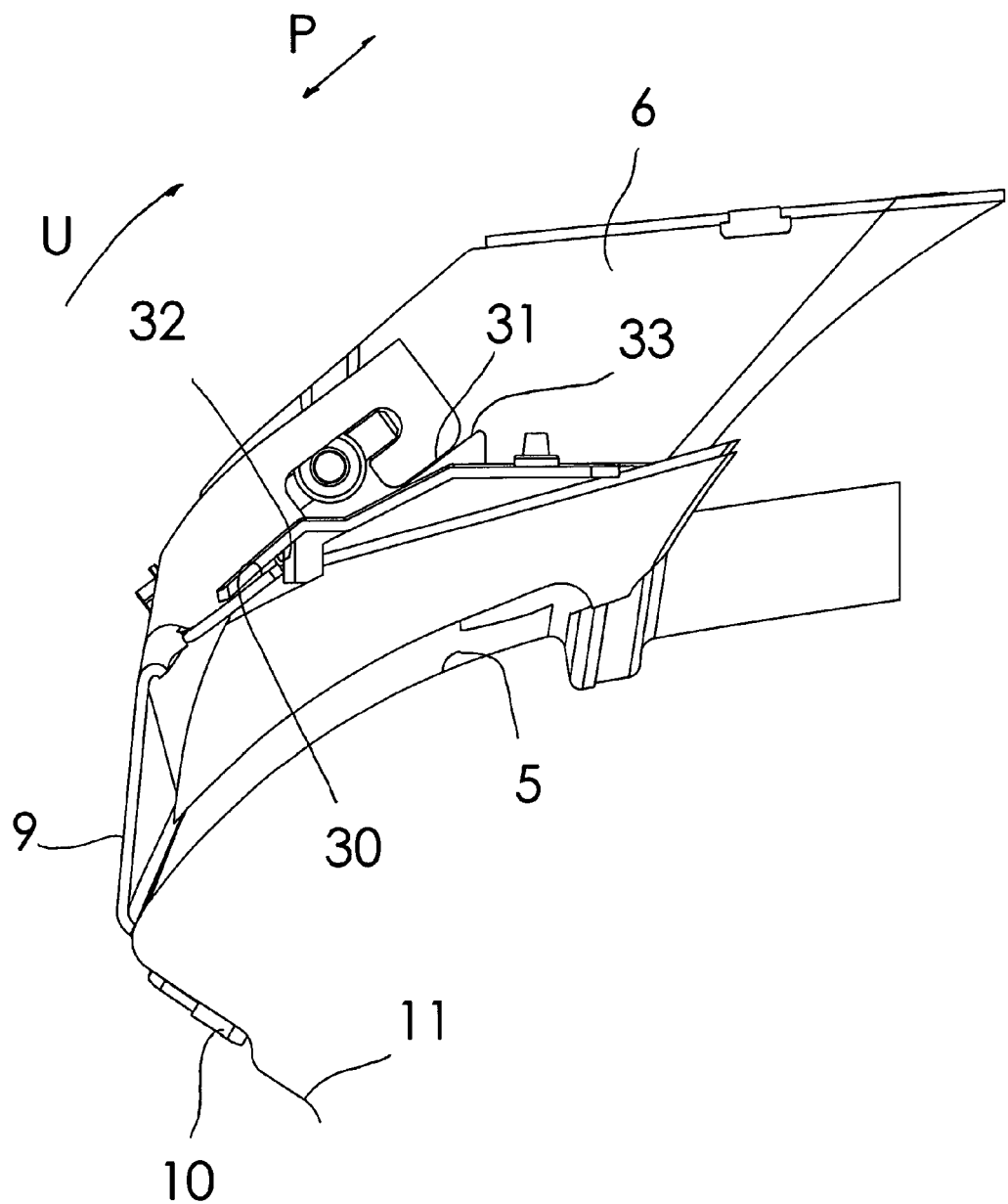
FIG. 5 is a detail view from which the interaction between the clamping plate and the foot part is clearly seen.

FIG. 5 shows the interaction of the contact faces. The figure shows the foot part mounted on a roof edge area 5. The clamping plate 9 grips a body fold 11 with its gripping means 10 and the clamping plate 9 is tightened upward in the direction indicated by the double arrow P. The interaction which occurs between the first lower contact faces 30 and the second lower contact faces 32 and the first upper contact faces 33 and second upper contact faces 31, respectively, prevents the clamping plate from turning about the pivot pin 22 in the clockwise direction, which direction is indicated by the arrow U, ensuring the gripping means 10 does not lose its grip on the body form 11.

Figure 6:
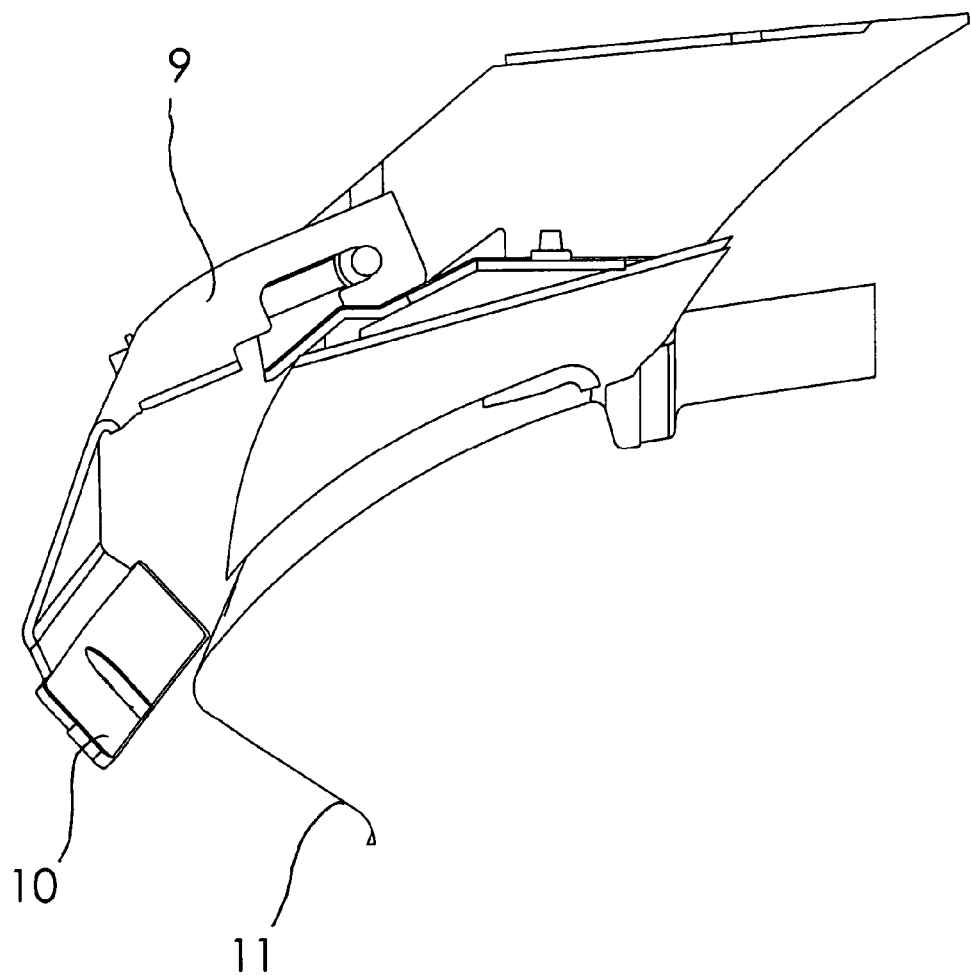
FIG. 6 is a view corresponding to FIG. 5 showing the load carrier foot in a non-tightened position.

In FIG. 6, the clamping plate has been moved downward in the direction indicated by the double arrow P, and in which position the contact faces have been separated and the clamping plate is free to turn in the clockwise direction. This facilitates both simple mounting and simple removal of the load carrier foot.

In view of the above, there has been described a load carrier foot (4) for mounting a load carrier bar (3) on a vehicle roof (2). The load carrier foot comprises a foot part (6), consisting of a base part (13) and a housing part (14) which, at its upper end (7), is attached to the load carrier bar and which, at its lower end (8), is mounted on a roof edge area (5) on the vehicle. The foot part is secured to the roof by means of a clamping plate (9) which, by means of an integral gripping means (10), grips a body fold (11) located under the body edge area. The clamping plate is in pivot able engagement with the foot part with a pivot pin (22) and in tighten able engagement with a tightening means (26). The foot part and the clamping plate are each provided with contact faces (30 and 32), which are located under the pivot pin when the load carrier foot is secured to the vehicle roof. The contact faces (30 and 32) interact in a locking manner to prevent the clamping plate from turning about the pivot pin and causing the gripping means to lose its grip on the body fold when the clamping plate is tightened against the foot part. The pivot pin (22) is pivotally connected to the foot part (6), and the clamping plate (9) and foot part (6) are each provided with contact faces (31 and 33) which are located above the pivot pin (22) and which interact in a locking manner, and which further prevent the clamping plate gripping means from losing grip on the body fold (11) when the clamping plate is tightened by the tightening arrangement (26).

What is claimed is:

1. A load carrier foot for mounting a load carrier bar on the roof of a vehicle, said load carrier foot comprising:
   a foot part having a base part and a housing part, the foot part having an upper end for attachment to the load carrier bar, and the foot part having a lower end for mounting on a roof edge area on the vehicle, the foot part having a clamping plate for securing the foot part to the roof of the vehicle, the clamping plate having integral gripping portion for gripping a body fold located under a body edge area of the vehicle, the clamping plate being in pivotable engagement with the foot part by means of a pivot pin and in tightenable engagement with the foot part by means of a tightening arrangement, the foot part and the clamping plate each having contact faces which are located under the pivot pin when the load carrier foot is secured to the vehicle roof which faces interact in a locking manner to prevent the clamping plate from turning about the pivot pin and causing the gripping portion to lose its grip on the body fold when the clamping plate is tightened against the foot part, wherein the pivot pin is pivotably connected to the foot part, the clamping plate and the foot part each have contact faces which are located above the pivot pin and which interact in a locking manner, and which further prevent the clamping plate gripping portion from losing its grip on the body fold when the clamping plate is tightened by the tightening arrangement, wherein the tightening means includes a screw threaded into a tapped hole in the pivot pin.

2. The load carrier foot as recited in claim 1, wherein the pivot pin is connected to walls included in the housing part.

3. The load carrier foot as recited in claim 1, wherein the housing part has walls formed with channels into which the pivot pin is seated.

4. The load carrier foot as recited in claim 1, wherein the clamping plate is movable in a downward direction with respect to the foot part for enabling the contact faces to become separated for removing the load carrier foot from the roof of the vehicle.

5. A load carrier foot for mounting a load carrier bar on a roof of a vehicle, the load carrier foot comprising:
   a foot part having an upper end for attachment to the load carrier bar, and a lower end for mounting on a roof edge area; and a clamping plate for gripping a body fold of the vehicle and securing the foot part to the roof of the vehicle, the clamping plate being coupled to the foot part by a tightening mechanism and a pivot pin in pivotable engagement with the foot part, wherein the foot part and the clamping plate are each provided with contact faces above and below the pivot pin, the contact faces interacting in a locking manner to prevent the clamping plate from turning about the pivot pin and losing a grip on the body fold when the clamping plate is tightened against the foot part, wherein the tightening mechanism includes a screw threaded into a tapped hole in the pivot pin.

6. The load carrier foot as recited in claim 5, wherein the foot part has housing walls, and the pivot pin is connected to the housing walls of the foot part.

7. The load carrier foot as recited in claim 5, wherein the foot part has housing walls formed with channels into which the pivot pin is seated.

8. The load carrier foot as recited in claim 5, wherein the clamping plate is movable in a downward direction with respect to the foot part for enabling the contact faces to become separated for removing the load carrier foot from the roof of the vehicle.

9. A load carrier foot for mounting a load carrier bar on a roof of a vehicle, the load carrier foot comprising:
   a foot part having an upper end for attachment to the load carrier bar, and a lower end for mounting on a roof edge area; and a clamping plate for securing the foot part to the roof of the vehicle, the clamping plate having a gripping portion for gripping a body fold of the vehicle, the clamping plate being coupled to the foot part by tightening means and a pivot pin in pivotable engagement with the foot part, wherein the foot part and the clamping plate are each provided with contact faces above and below the pivot pin, the contact faces interacting in a locking manner to prevent the clamping plate from turning about the pivot pin and causing the gripping portion to lose its grip on the body fold when the clamping plate is tightened against the foot part, wherein the tightening means includes a screw threaded into a tapped hole in the pivot pin.

10. The load carrier foot as recited in claim 9, wherein the foot part has housing walls, and the pivot pin is connected to the housing walls of the foot part.

11. The load carrier foot as recited in claim 9, wherein the foot part has housing walls formed with channels into which the pivot pin is seated.

12. The load carrier foot as recited in claim 9, wherein the clamping plate is movable in a downward direction with respect to the foot part for enabling the contact faces to become separated for removing the load carrier foot from the roof of the vehicle.

13. A load carrier foot 4 mountable on the roof 2 of a vehicle 1 having a longitudinal centerline and a pair of lateral side edges 5, each forming a fold 11 upon which a load carrier foot 4 is releasably anchorable, said load carrier foot 4 comprising:

a foot part 6 having a base part 13 locatable proximate one of the lateral side edges of the roof of the vehicle in an installed configuration;

a clamping plate 9 pivotably connected to the foot part 6 by a pivot pin 22, said clamping plate 9 having a hook portion 10 releasably hookable on the fold formed at the respective lateral side edge of the vehicle proximate the base part 13;

said foot part 6 further having an inner side positioned toward the longitudinal centerline of the vehicle interior to the pivot pin 22, and an outer side positioned toward the respective lateral side edge of the vehicle exterior to the pivot pin 22;

said base part 13 comprising a first upper contact surface 33 located interior of the pivot pin 22 and inclining from the outer side toward the inner side of the foot part 6;

a tightening arrangement 22 that advances the clamping plate 9 toward the inner side of the foot part 6 from a released configuration to a secured configuration; and said clamping plate 9 comprising a second upper contact face 31 slidingly abutting the first upper contact surface 33 in face-to-face engagement therewith, the second upper contact face 31 and the first upper contact surface 33 being configured so that in the secured configuration the clamping plate 9 is restrained against pivotation relative the foot part 6;

said base part 13 comprising a first lower contact surface 30 located exterior of the pivot pin 22 and inclining from the outer side toward the inner side of the foot part 6; and said clamping plate 9 comprising a second lower contact face 32 slidingly abutting the first lower contact surface 30, the second lower contact face 32 and the first lower contact surface 30 being configured so that in the secured configuration the clamping plate 9 is restrained against pivotation relative the foot part 6.

* * * * *